Dec. 20, 1955     G. W. RENNER     2,728,063
PRESSURE POLARIZED TRANSDUCERS
Filed Feb. 27, 1951     2 Sheets-Sheet 1

INVENTOR
GERARD W. RENNER
BY
ATTORNEY

United States Patent Office 2,728,063
Patented Dec. 20, 1955

2,728,063

PRESSURE POLARIZED TRANSDUCERS

Gerard W. Renner, Dorchester, Mass., assignor to Raytheon Manufacturing Company, Newton, Mass., a corporation of Delaware Application February 27, 1951, Serial No. 213,001

6 Claims. (Cl. 340—11)

The present invention relates to pressure polarized transducers of the tubular magnetostrictive type.

It is well known that transducers must be under an initial tension in order to accurately translate a compressional wave into an alternating electric current. With radially vibrating tubular magnetostrictive transducers of the type disclosed in Patent No. 2,521,136 to Thuras, this bias or polarization is applied by (1) a direct current component introduced into the windings, (2) by the insertion of a permanent magnet in the cylindrical surface of the tubular transducer, or (3) by the remanent magnetism of a once magnetized transducer tube.

The direct current method of polarization requires a separate source of power for this purpose, thus adding to the expense of manufacturing and maintaining the equipment.

The insertion of a permanent magnet involves additional expense of manufacture due to the added step of introducing the permanent magnet into the cylindrical surface of the tube.

If the transducer tube is magnetized once and the remaining magnetization relied on to give the necessary bias or polarization, a compromise must be made in selecting the alloy for the tube. In order to produce an efficient transducer, an alloy having a low retentivity and high permeability should be used. However, it is difficult to obtain sufficient bias with such an alloy relying on remanence. If an alloy having a greater retentivity is used, it will have less permeability and be a less efficient transducer.

It has been found that if a material having a positive magnetostrictive effect, such as the nickel-iron alloys and the iron-cobalt alloys, is used for the tube, and if the walls are sufficiently thin in respect to the diameter of the tube, a large circumferential stress can be set up in the walls by a relatively small internal pressure applied uniformly over the inside surface of the tubing. Such a pressure can be applied through a mechanism or with any fluid, preferably air, or a gas. This stress set up in the tube wall will effectively increase the flux density of any magnetic field present in the transducer, no matter how slight, and will effectively polarize the transducer. The magnetic field of the earth may be sufficient for this purpose, or the magnetomotive force remaining in a magnetostrictive tube made of a material of such a low retentivity as 45 Permalloy.

In the case of magnetostrictive materials, such as nickel having a negative magnetostrictive effect, external pressure is used instead of internal.

In certain applications of magnetostrictive transducers, it is necessary to expose them to fluid pressure. This pressure may be great enough to constrict the tube and counteract the bias or polarization whether caused by a magnetic field or by pressure. Internal pressure may be used to restore the original bias instead of attempting to increase the polarizing magnetic field. The use of internal pressure polarization is especially useful in applications where the transducer is to be exposed to varying external pressure, as this internal polarizing pressure may be easily maintained at all times at a point sufficiently above the external pressure to counteract its effects and also intensify the polarizing effect of any magnetic flux present in the transducer to a point where the optimum operating bias is maintained.

In the case of magnetostrictive materials having a negative effect, the external pressure would never be completely compensated by the internal pressure.

The advantages of pressure polarization of magnetostrictive tubular transducers are:

1. Simplicity of construction: a valve and internal pressure replace expensive magnets or costly direct current polarization;

2. Stability of polarization: mechanical vibration, shock, heat treatment, etc., will not affect pressure polarization as they would permanent magnetic polarization;

3. Large pulses of alternating current are not as likely to depolarize the transducer as a much smaller degree of remanent magnetization will still permit the transducer to be usable although the pressure may have to be increased to return the bias point to the desired level;

4. The stresses in the tube will be more uniformly distributed as this distribution will be dependent mainly on the geometry of the tube rather than on irregularities in the magnetic circuit, such as air gaps;

5. The bias is easily maintained constant while the external pressure varies;

6. The magnetostrictive tube material may be selected for its alternating current properties without much consideration to its retentivity so that a more efficient magnetostrictive material may be used as a transducer without introducing distortion due to inadequate bias.

Thus a more efficient and cheaper magnetostrictive tubular transducer may be produced by the use of pressure biasing.

The foregoing and other advantages, objects and features of the invention will be better understood from the following description taken in conjunction with the accompanying drawings, wherein.

Figure 1:
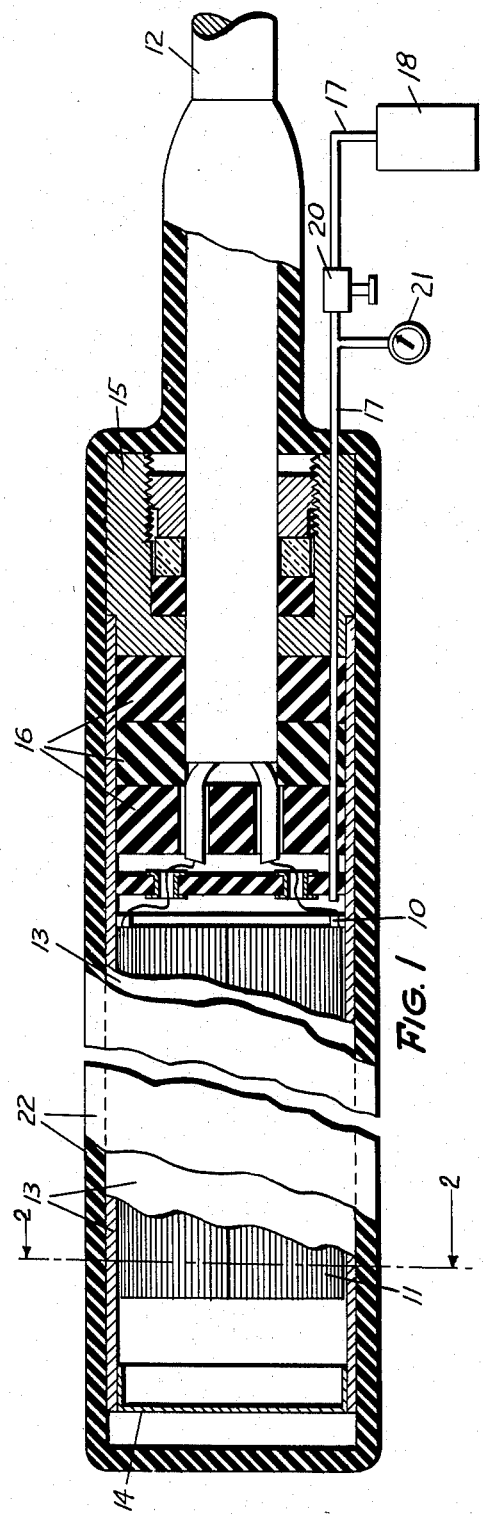
Fig. 1 is a longitudinal view partly in section of a preferred embodiment of the transducer according to the present invention.

In Fig. 1 reference numeral 10 represents a core of highly permeable material about which is wound a coil 11 connected by a two-wire cable 12 to an oscillator, a receiver or other equipment (not shown) of any of the types customarily used with transducers of this type. The coil 11 on its core 10 is inserted in a magnetostrictive tube 13. The tube 13 is sealed off with a metal cap 14 and a metal plug 15 through which the cable 12 passes.

Padding 16 of resilient material, such Rho c rubber, is also inserted between the core 10 and the plug 15. A pipe 17 leads from the interior of the tube 13 through the plug 15 to a source 18 of fluid, preferably air, or some gas, under pressure through a valve 20 that may be either manually or automatically controlled according to the external pressure and other factors so that the internal pressure may be brought up to, and maintained at, the desired pressure as indicated by a gauge 21. The transducer is enclosed in a sheath 22 of Rho c rubber, or other resilient material, to protect it from corrosion by sea water while permitting the walls of the tube 13 to flex freely with changing pressures.

The transducer has been shown relatively much larger than the other elements of the system to bring out the details of its construction. The other elements of the system, such as pipe 17, the source of fluid 18, the valve 20, and the gauge 21, have been shown schematically on a much smaller scale merely to suggest a means for applying fluid under pressure to the interior of the transducer.

As an example of desirable dimensions and pressures, in a tube of 45 Permalloy having an outside diameter of 1 inch and an inside diameter of 0.96 inch, an internal gas pressure of 75 pounds per square inch will establish approximately optimum polarization. As an indication of the maximum pressures that might be applied, an unsupported relatively long length of such tubing is capable of withstanding an internal or external pressure of several hundred pounds per square inch before bursting or collapsing. With supports at both ends and relatively short lengths of tubing, even greater pressure could be withstood.

Other means for applying internal pressure to the magnetostrictive tube, such as compressed helical springs, bellows extensions of the magnetostrictive tube under screw compression, etc., as well as the fluid pressure from an external source described here as the preferred means, could be used as specific embodiments of the present invention.

Figure 3:
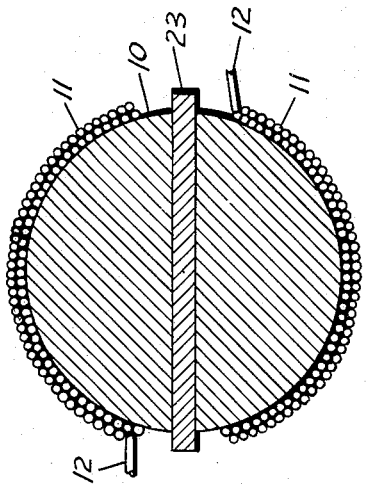
Fig. 3 is a similar section of a modification.
Figure 2:
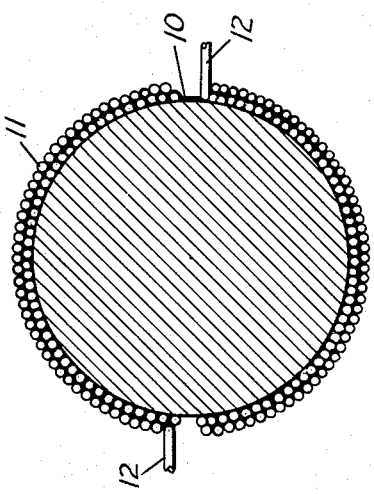
Fig. 2 is a section along the line 2—2 of Fig. 1.

Fig. 3 shows that where a larger degree of polarization is need than can be supplied by the remanent magnetization of the transducer tube, a greater flux density may be provided by the insertion of a permanent magnet 23 into the core 10 between the halves of the coil 11. The internal pressure would then be used to intensify the field of this permanent magnet 23, and, if necessary, to compensate for any external pressure that might tend to overcome the polarization imposed by the permanent magnet 23.

As explained above, the tube 13 itself could be permanently magnetized, even weakly, and the field intensified by the application of internal pressure in the manner of this invention. The earth's magnetic field as concentrated by internal pressure would be sufficient for some applications.

Figures 4, 5:
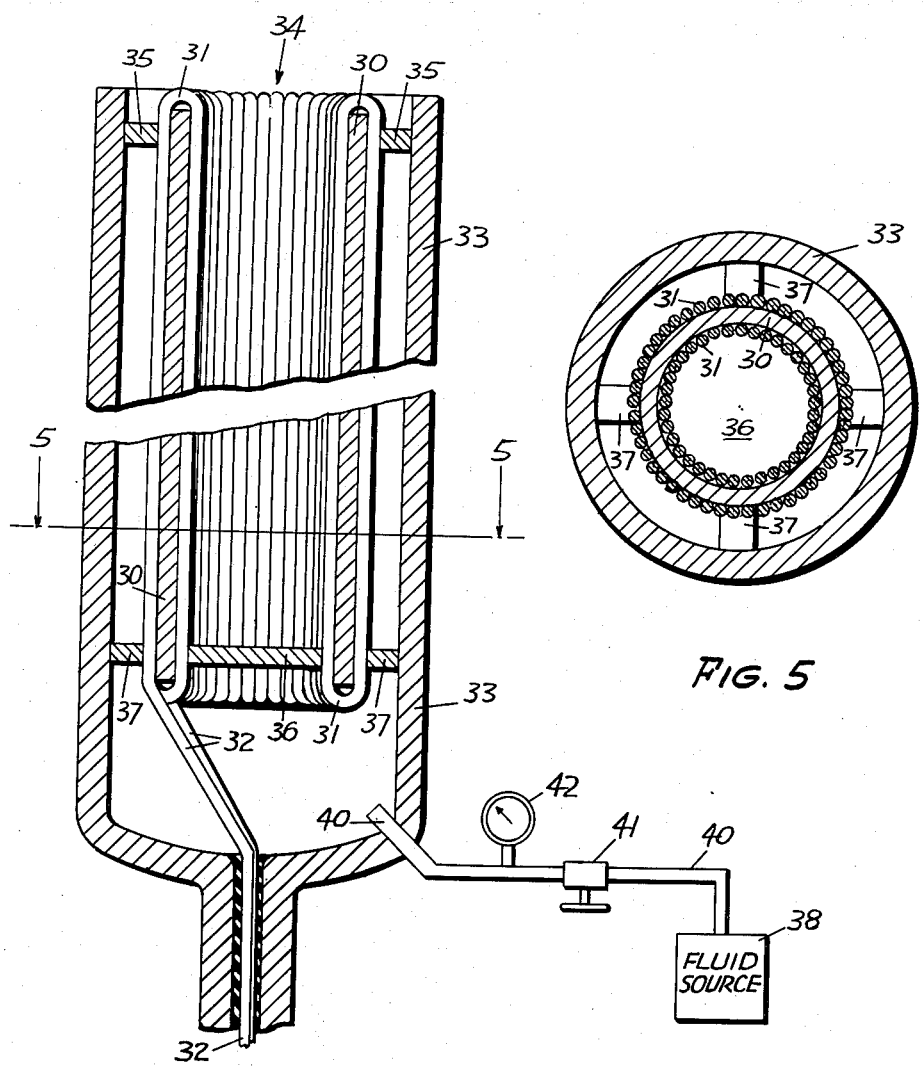
Fig. 4 is a longitudinal view partly in section of an embodiment of the transducer adapted for applying pressure to the outside of the transducer tube.
Fig. 5 is a section along the line 5—5 of Fig. 4.

As pointed out above with transducers made of a material with a negative magnetostrictive effect, such as nickel, external pressure is needed to create an appropriate bias. Figs. 4 and 5 show how such a pressure could be applied to a tubular transducer. The magnetostrictive tube 30 is toroidally wound with a coil 31 connected to an external circuit by wires 32. This tube 30 is mounted in an outer metallic cylinder 33 with one end 34 opened to the propagating medium, such as sea water. This open end is supported by a ring 35 forming a pressure tight seal with the tube 30 and its coil. The other end of the tube 30 is sealed with a metal disk 36 and spaced from the other cylinder 33 by a spider 37 or other convenient means of support permitting a free flow of fluid pressure within the outer cylinder 33 and about the outside of the magnetostrictive tube 30. The space between the outer cylinder 33 and the tube 30 is filled with fluid, such as liquid, air, or any gas under pressure. This fluid is supplied from a source 38 and introduced into the chamber by a pipe 40 through to the wall of the cylinder 33. The pressure is indicated by the gauge 42 and controlled by the valve 41 associated with the pipe 40. The resultant circumferential constriction will tend to expand the radial thickness of the wall of the tube 30 and give the desired negative bias to the negative magnetostrictive tube.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A magnetostrictive transducer of the tubular type made of a material having a positive magnetostrictive effect, electromagnetic means for setting up a cyclically varying circumferential stress in the walls of the transducer tube, and controllable fluid pressure inducing means to exert an internal pressure in the tube to set up a fixed circumferential stress in the walls of the transducer tube.

2. A magnetostrictive transducer of the tubular type made of a material having a positive magnetostrictive effect, electromagnetic means for setting up a cyclically varying circumferential stress in the walls of the transducer tube, and means to exert an internal pressure in the tube to set up a fixed circumferential stress in the walls of the transducer tube, said internal pressure exerting means comprising controllable means for introducing into the interior of said transducer tube fluid under pressure.

3. A magnetostrictive transducer of the tubular type made of a material having a positive magnetostrictive effect, electromagnetic means for setting up a cyclically varying circumferential stress in the walls of the transducer tube, means for sealing the interior of the tube of the transducer, and controllable means for introducing into the interior of said transducer tube fluid under pressure to set up a fixed circumferential stress in the walls of the transducer tube.

4. A magnetostrictive transducer of the tubular type made of a material having a positive magnetostrictive effect, means for producing both a fixed and a cyclically varying magnetic flux in said tube to set up a circumferential stress in the walls of the transducer tube, and controllable fluid pressure inducing means to exert an internal pressure in the tube to set up a circumferential stress in the walls of the transducer tube.

5. A magnetostrictive transducer of the tubular type made of a material having a positive magnetostrictive effect, electromagnetic means for setting up a cyclically varying circumferential stress in the walls of the transducer, means for sealing the interior of the tube of the transducer, means for introducing into the interior of said transducer tube fluid under pressure to set up a fixed circumferential stress in the walls of the transducer tube, and means for controlling the pressure of the fluid in said tube.

6. A magnetostrictive transducer of the tubular type made of a material having a positive magnetostrictive effect, electromagnetic means for setting up a cyclically varying circumferential stress in the walls of the transducer, the tube of said transducer having a circumferential magnetic flux, and controllable means to exert an internal fluid pressure in the tube to set up a fixed circumferential stress in the walls of the transducer tube.

References Cited in the file of this patent

UNITED STATES PATENTS

| | | |
|---|---|---|
| 2,400,063 | Barton | May 14, 1946 |
| 2,431,026 | Bundy | Nov. 8, 1947 |
| 2,452,086 | Turner | Oct. 26, 1948 |
| 2,511,689 | Beechlyn | June 13, 1950 |
| 2,521,136 | Thuras | Sept. 5, 1950 |